(12) United States Patent
Olin (10) Patent No.: US 11,856,885 B1
(45) Date of Patent: Jan. 2, 2024

(54) MULTIUSE BLADE ASSEMBLY

(71) Applicant: Jason Olin, Seguin, TX (US)

(72) Inventor: Jason Olin, Seguin, TX (US)

( * ) Notice: Subject to any disclaimer, the term of this patent is extended or adjusted under 35 U.S.C. 154(b) by 0 days.

(21) Appl. No.: 16/297,636

(22) Filed: Mar. 9, 2019

(51) Int. Cl.
*A01D 34/68* (2006.01)
*A01D 34/73* (2006.01)

(52) U.S. Cl.
CPC .......... *A01D 34/736* (2013.01); *A01D 34/68* (2013.01)

(58) Field of Classification Search
CPC .... A01D 34/736; A01D 34/733; A01D 34/68; A01D 34/664; A01D 34/46; A01D 34/63; A01D 34/412; A01D 34/84; A01D 34/828; A01D 34/535; A01D 34/435; A01D 75/18; A01D 75/20; A01G 3/06
See application file for complete search history.

(56) References Cited

U.S. PATENT DOCUMENTS

| | | | | | |
|---|---|---|---|---|---|
| 2,697,323 | A * | 12/1954 | Horn | ............... | A01D 34/736 83/698.41 |
| 2,850,862 | A * | 9/1958 | Asbury | ............... | A01D 34/736 56/295 |
| 2,924,058 | A * | 2/1960 | Brooks | ............... | A01D 34/73 56/295 |
| 3,000,165 | A * | 9/1961 | Lill | ............... | A01D 34/63 56/13.4 |
| 3,028,719 | A * | 4/1962 | Jepson | ............... | A01D 34/63 56/295 |
| 3,184,907 | A * | 5/1965 | Harloff | ............... | A01D 34/73 56/295 |
| 3,320,732 | A * | 5/1967 | Kirk | ............... | A01D 34/736 56/295 |
| 3,415,047 | A * | 12/1968 | Blecke | ............... | A01D 34/73 56/295 |
| 3,540,198 | A * | 11/1970 | Erickson | ............... | A01D 34/404 56/295 |
| 3,621,642 | A * | 11/1971 | Leake, Jr. | ............... | A01D 34/736 56/295 |
| 3,815,234 | A * | 6/1974 | Nelson | ............... | A01D 34/84 30/276 |

(Continued)

FOREIGN PATENT DOCUMENTS

| | | | | |
|---|---|---|---|---|
| EP | 1358786 A1 | * 11/2003 | ........... | A01D 34/733 |
| FI | 121324 B | * 10/2010 | ........... | A01D 34/733 |

(Continued)

*Primary Examiner* — Thomas B Will
*Assistant Examiner* — Madeline I Runco
(74) *Attorney, Agent, or Firm* — Wayne J. Colton, Inc.

(57) ABSTRACT

A blade assembly for cutting vegetative material includes a rotatable body and a number of inertially deployable blades hingedly affixed to the rotatable body. Each blade is rotatable between a first retracted position and a second extended position, and each blade cooperates with the body to form a capture mechanism preventing detachment of the blade from the body in the event the hinged affixation of the blade fails. The body includes a guide plate positioned between a top cover and a bottom cover. The covers provide hinge points for the blades at desired locations relative to the guide plate. The guide plate may include fixed blades, and blade stops may be implemented to retain each blade in the first retracted position or in a position intermediate the first retracted position and the second extended position.

13 Claims, 13 Drawing Sheets

(56) References Cited

U.S. PATENT DOCUMENTS

| | | | | |
|---|---|---|---|---|
| 3,894,385 | A * | 7/1975 | Brown, Jr. | A01D 34/736 56/295 |
| 3,965,658 | A * | 6/1976 | van der Lely | A01D 34/661 56/192 |
| 4,114,354 | A * | 9/1978 | Morris | A01D 34/6806 56/295 |
| 5,063,731 | A * | 11/1991 | Hull | A01D 34/73 144/218 |
| 5,561,972 | A * | 10/1996 | Rolfe | A01D 34/005 56/295 |
| 5,617,636 | A * | 4/1997 | Taggett | A01D 34/736 30/276 |
| 5,622,035 | A * | 4/1997 | Kondo | A01D 34/733 30/276 |
| 6,817,102 | B2 * | 11/2004 | Harris | A01D 34/736 30/276 |
| 7,543,432 | B1 * | 6/2009 | Osborne | A01D 34/828 56/17.5 |
| 8,221,203 | B1 * | 7/2012 | Flickinger | A01F 29/095 460/112 |
| 8,667,695 | B2 * | 3/2014 | Yamaoka | A01D 34/736 30/276 |
| 9,480,201 | B2 * | 11/2016 | Maruyama | B60L 50/52 |
| 9,743,583 | B2 * | 8/2017 | Witty | A01D 34/53 |
| 9,992,930 | B2 * | 6/2018 | Stoffel | A01D 34/664 |
| 10,863,670 | B2 * | 12/2020 | Kang | A01D 34/736 |
| 2012/0318114 | A1 * | 12/2012 | Esain Eugui | A01D 45/10 83/651 |
| 2018/0139901 | A1 * | 5/2018 | Teko | A01D 34/73 |
| 2018/0153099 | A1 * | 6/2018 | Hwang | A01D 34/736 |
| 2018/0295775 | A1 * | 10/2018 | Kang | A01D 34/736 |
| 2019/0001336 | A1 * | 1/2019 | Lutoslawski | B02C 13/2804 |

FOREIGN PATENT DOCUMENTS

| | | | | |
|---|---|---|---|---|
| FR | 2776952 | A1 * | 10/1999 | B02C 18/18 |
| FR | 2776953 | A1 * | 10/1999 | A01D 34/535 |
| FR | 2917943 | A1 * | 1/2009 | A01D 34/828 |
| KR | 1317832 | B1 * | 10/2013 | |
| WO | WO-0032025 | A1 * | 6/2000 | A01D 34/736 |
| WO | WO-2012068657 | A1 * | 5/2012 | A01D 34/733 |

\* cited by examiner

MULTIUSE BLADE ASSEMBLY

FIELD OF THE INVENTION

The present invention relates to landscape maintenance. More particularly, the invention relates to a multiuse blade assembly particularly adapted to safely and efficiently cut vegetation of widely differing characteristics, including, for example, grasses, weeds, and light brush.

BACKGROUND OF THE INVENTION

Property management, residential maintenance, building construction, and similar activities often involve the task of landscape maintenance. Especially in the more industrial of the activities, such as, for example, property management or building construction, the required landscape maintenance will generally entail clearing of grossly overgrown tracts, which more often than not comprise a mix of disparate vegetation. Although brush trimmers including saw-type blades, string trimmers, and the like are well known in the relevant art, the described environment more often than not requires a mix of several different types of machines in order to achieve satisfactory results. In the best of circumstances under the present state of the art, the described environment can only adequately be addressed with a single machine by "changing out" the type of cutting mechanism—e.g., switching a string trimmer mechanism for a blade arrangement or vice versa. In any case, the task is overly time consuming, and often ends with less than desired results.

With the shortcomings of the prior art clearly in mind, it is an overriding object of the present invention to provide an efficient cutting blade assembly that is not only useful for cutting disparate types of vegetation, but also exhibits better cutting performance than achievable under the current state of the art.

Additionally, it is an object of the present invention to provide such a cutting blade assembly that enables more efficient operation of the brush cutter or other rotary drive with which the blade assembly is put to use, and, in particular, enables effective operation at lower rotational speeds.

Still further, it is an object of the present invention to provide such a cutting blade assembly that is resistant to impact damage, such as may otherwise result from striking a rock or other non-vegetative object, and also does not utilize rapidly consumable materials, such as cutting filaments, each of these objects thereby reducing cost of operation.

It is also an object of the present invention to provide such a cutting blade assembly hat does not tear or pull vegetative materials, such as is the case, for example, with string trimmers, and therefore does not throw grass and like particles, dirt and mud, and the like on the operator's clothing or exposed body or onto nearby structures or the like.

Finally, it is an important object of the present invention to provide such a cutting blade assembly that also includes built-in safety features, and, in particular, includes design features adapted to contain a cutting blade in the event that the mounting structure for the blade becomes broken or is otherwise unintentionally dislodged.

SUMMARY OF THE INVENTION

In accordance with the foregoing objects, the present invention a blade assembly for cutting vegetative material of disparate types—generally comprises a rotatable body adapted to couple to a rotary drive, such as a brush trimmer, and a plurality of inertially deployable blades hingedly affixed to the rotatable body. Each blade is rotatable between a first retracted position, wherein the blade is fully within the outer circumference of rotation of the body, and a second extended position, wherein a cutting edge of the blade extends outward from the outer circumference of rotation of the body. Additionally, each blade may be cooperatively adapted with the body to form a capture mechanism, which is adapted to prevent detachment of the blade from the body in the event the hinged affixation of the blade fails.

The body preferably comprises a guide plate, and each capture mechanism may be implemented as a first point of contact between the corresponding blade and the guide plate, and a second point of contact between the corresponding blade and the guide plate. The guide plate is most preferably positioned between a top cover and a bottom cover, the top and bottom cover providing hinge points for the blades at desired locations relative to the guide plate.

The guide plate may comprise a plurality of fixed blades, and the blade assembly may further comprise a first set of selectively provided blade stops, or a first set of selectively provided blade stops and a second or more sets of selectively provided blade stops. One set of is blade stops may be adapted to retain each blade in the first retracted position, and one set of blade stops may be adapted to retain each blade in a position intermediate the first retracted position and the second extended position.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein:

FIG. 4 shows, in a top plan view, various details of e guide plate of the blade assembly of FIG. 1;

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
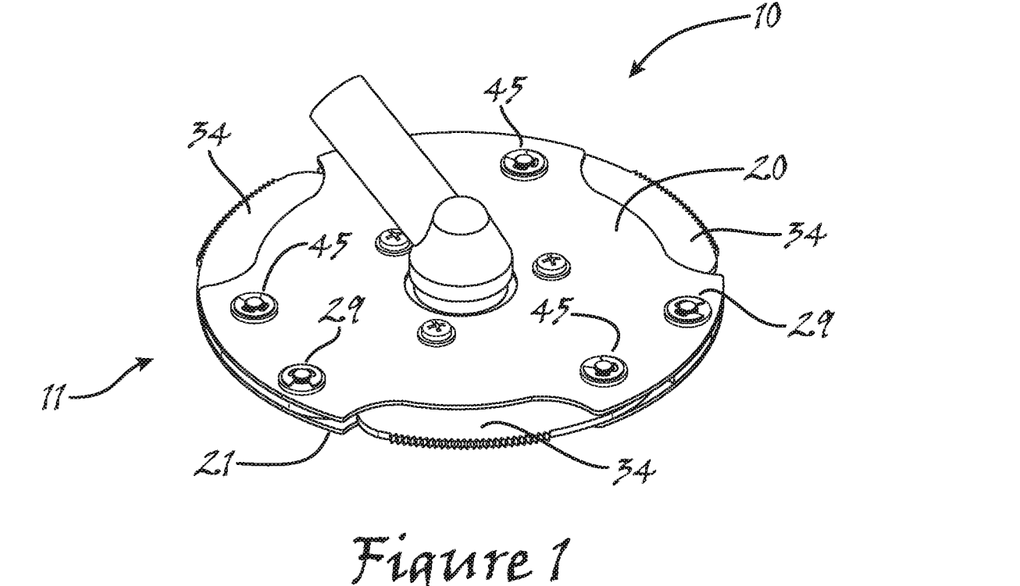
FIG. 1 shows, in an isometric view, a first preferred implementation of the blade assembly of the present invention, as prepared for use in connection with a rotary drive.
Figure 2:
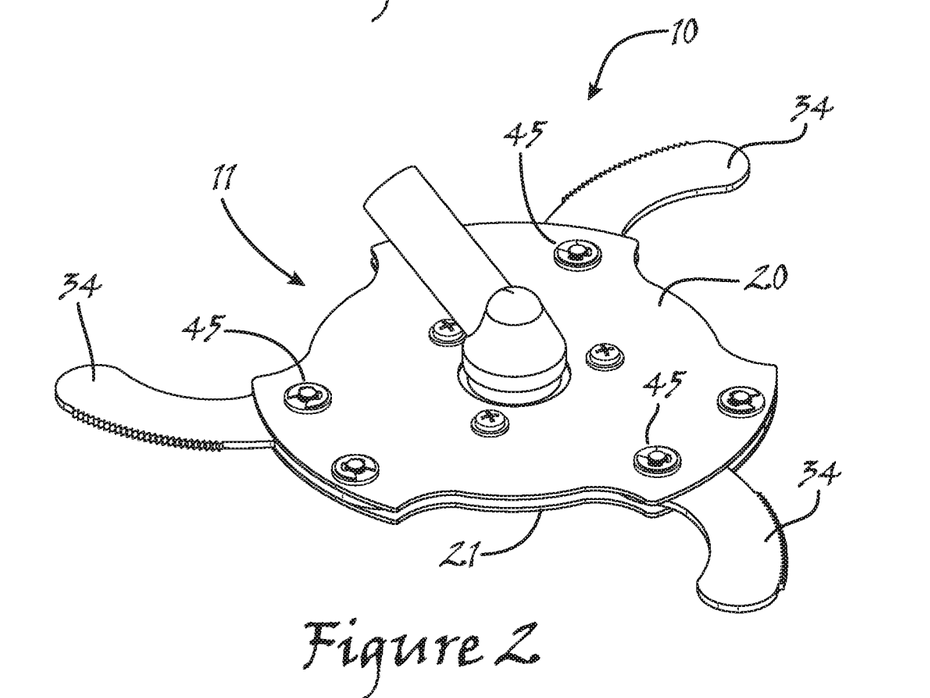
FIG. 2 shows, in the isometric view of FIG. 1, the blade assembly of FIG. 1, as the inertially deployed blades are extended in use.

Referring now to the figures, and to FIGS. 1 and 2 in particular, the blade assembly 10 for cutting vegetation of widely differing characteristics, as implemented in accordance with the present invention, is shown to generally comprise a rotatable body 11, which hingedly supports a plurality of inertially deployed blades 34. As particularly shown in FIG. 1, the blades 34 are contained substantially within circumference of the rotatable body 11 when the rotatable body 11 is at rest or rotating at very low speed. As shown in FIG. 2, on the other hand, rotation of the rotatable body 11 causes the blades 34 to swing, under inertial forces, outward from the rotatable body 11, and into operable position to engage vegetative material to be trimmed. As will be better understood further herein, however, should a blade 34 impact a rock or like object, the affected blade 34 will safely swing back into position within the circumference of the rotatable body 11. In this manner, damage to the blade 34 is generally prevented, and the blade assembly will remain firmly under the control of its operator.

Figure 3:
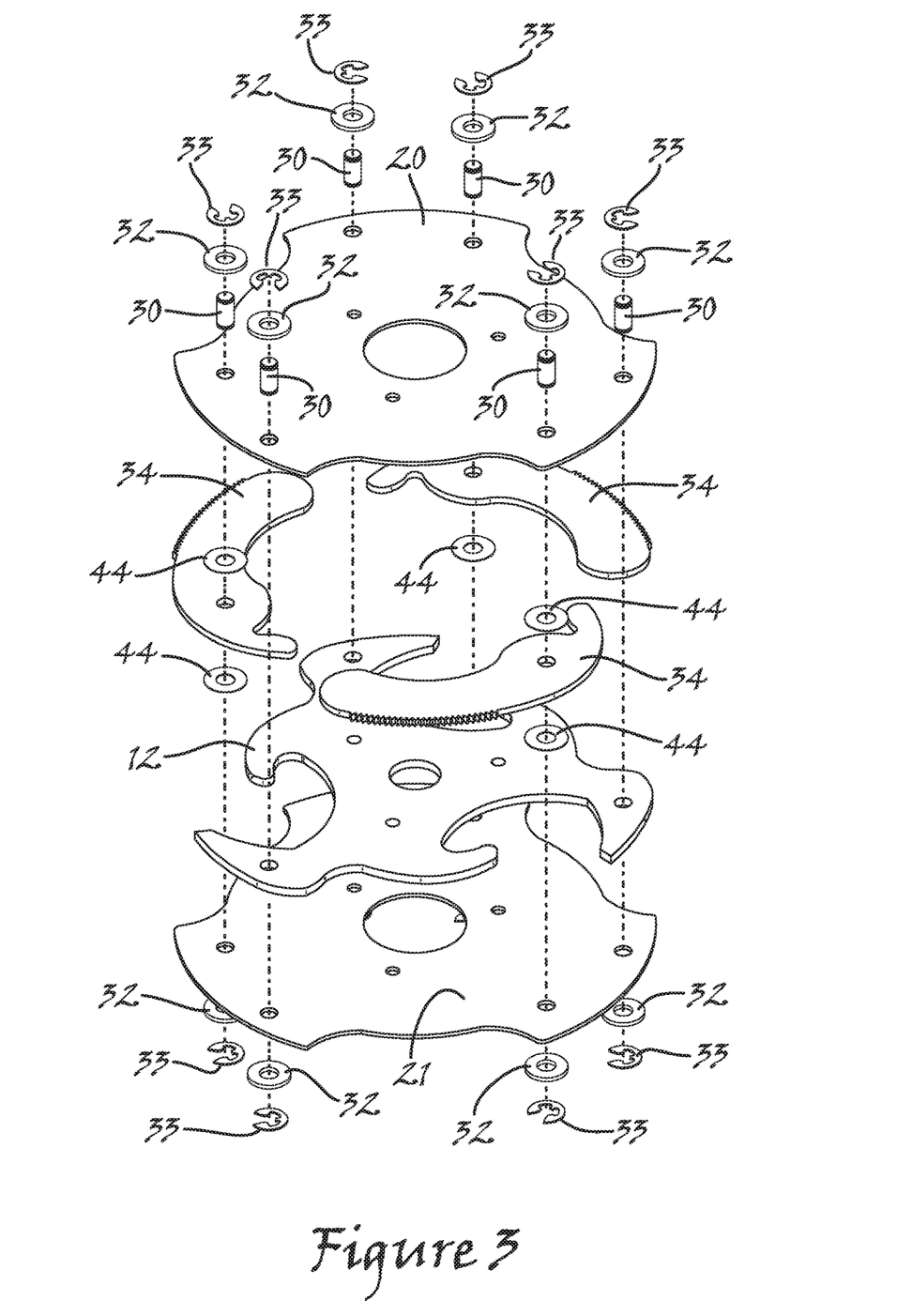
FIG. 3 shows, in an exploded first side isometric view, various details of the assembly of the blade assembly of FIG. 1.
Figure 4:
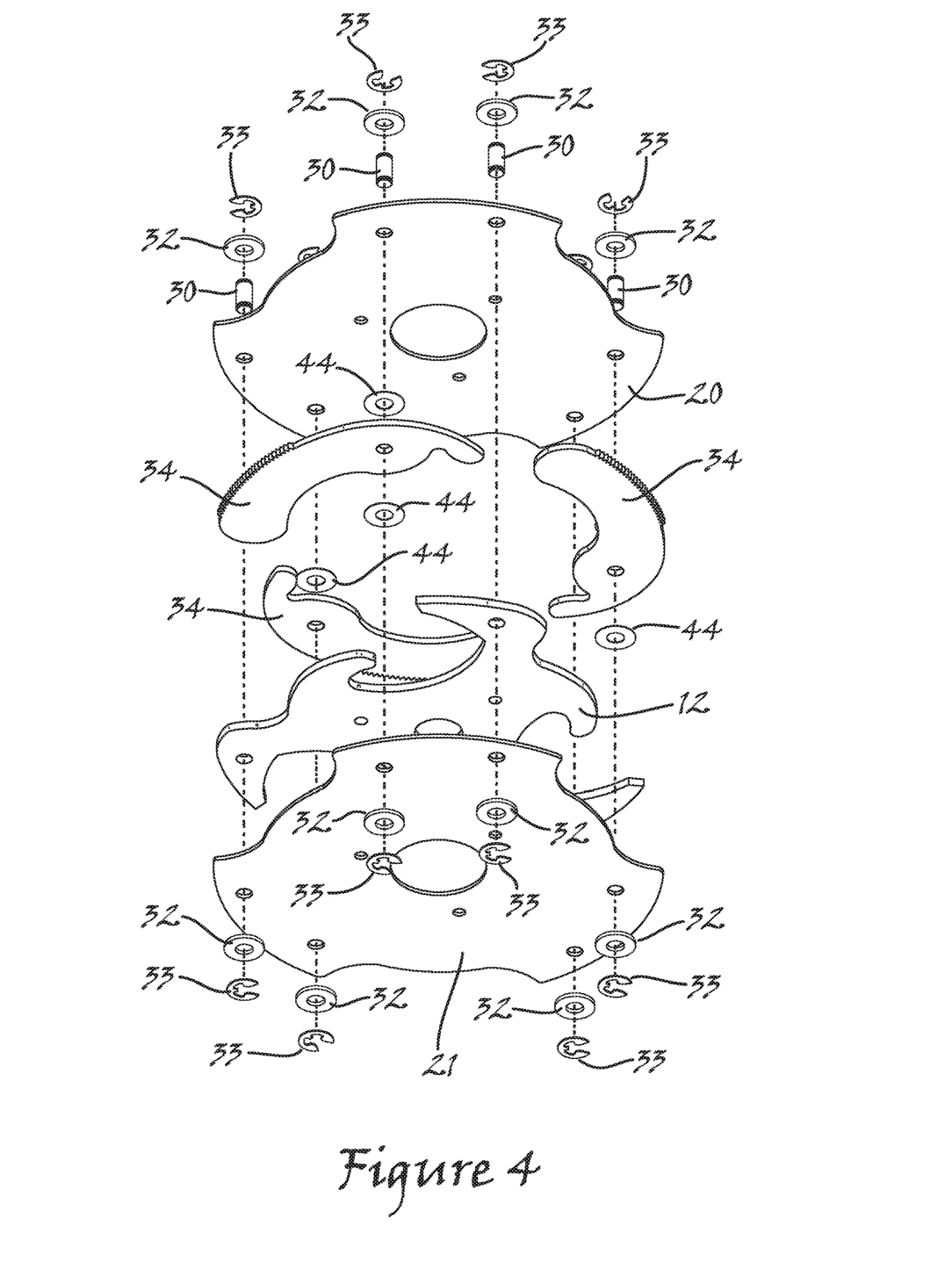
FIG. 4 shows, in a in an exploded second side isometric view, various additional details of the assembly of the blade assembly of FIG. 1.

Referring now also to FIGS. 3 and 4, the rotatable body 11 is shown to comprise a substantially planar guide plate 12, which is fixed in place between a top cover 20 and a bottom cover 21 utilizing a plurality of fasteners 29. As shown in the figures, and particularly in FIG. 5, the substantially planar guide plate 12 comprises a centrally located assembly mounting hole 13, which, as will be better understood further herein, adapts the blade assembly 10 for attachment to a rotary drive 46 such as, for example, a brush trimmer or the like. In order to receive the fasteners 29, the guide plate 12 further comprises a plurality of guide plate mounting holes 14. Additionally and as also will be better understood further herein, the guide plate 12 also comprises a plurality of stand-off mounting holes 15 for dependently receiving a stand-off 52, if desired, as will be described in greater detail further herein.

Figure 5:
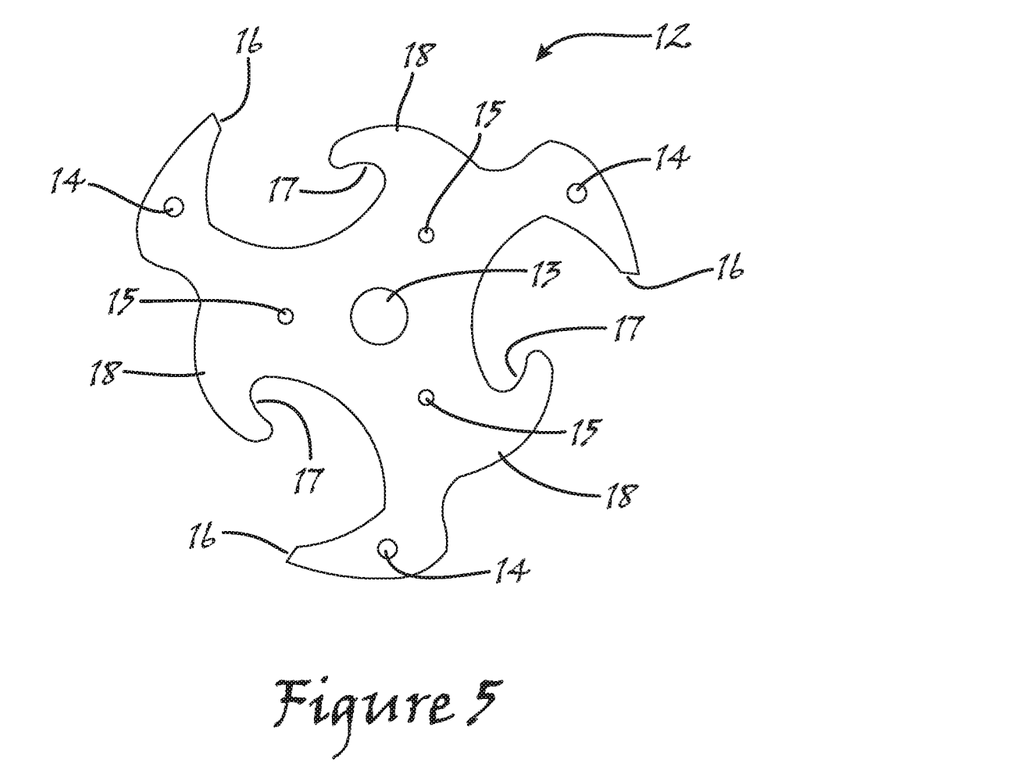

As will be better understood further herein, and in an important aspect of at least the most preferred implementations the present invention, the guide plate 12 may be sized, shaped, and otherwise cooperatively adapted with each of the inertially deployed blades 34 to form a capture mechanism, which mechanism prevents discharge of a blade 34 in the event of any failure or unintended release of the hinge pin or other axle 45 holding the blade 34 in place. To this end, the guide plate 12 comprises a first full extension stop, 16 as well as a second full extension stop 17 for each provided blade 34. Still further, and in another important aspect of the present invention, a backstop 18 is formed in the guide plate 12 for each blade 34, each backstop 18 being adapted to receive the force of any blade 34 swinging back into the extents of the rotatable body 11 following impact with a rock or other like object.

Figure 6:
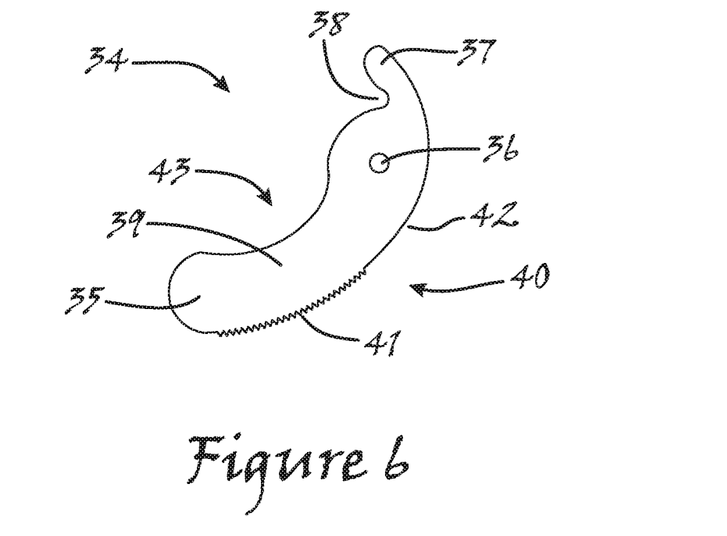
FIG. 6 shows, in a top plan view, various details of one of the inertially deployed blades of the blade assembly of FIG. 1.

As shown in FIG. 6, each inertially deployed blade 34 generally comprises a substantially planar body 35, which body 35 is preferably formed from a hardened steel such as, for example, SAE 4130 or the like. A mounting hole 36 is provided through each substantially planar body 35 for receiving an axle 45 through which the blade 34 is hingedly affixed to the rotatable body 11. A tang 37 or like shank projects, from the planar body 35 of each blade 34, in a first, interior direction away from the mounting hole 36 and generally opposite the exteriorly deployable cutting portion 39 of the blade 34. In at least the most preferred implementations of the present invention, and as will be better understood further herein, a semicircular catch 38 is formed in the elbow of the tang 37 for operably receiving selectively removable blade stops 58.

The exteriorly deployable cutting portion 39 of each planar body 35 comprises a leading edge 40 and a trailing edge 43. As shown in the figures, the leading edge 40 includes a serrated or otherwise sharpened cutting edge 41, and also an unsharpened portion 42, which is formed and positioned as a ricasso for a knife. As shown in the figures, at least the cutting edge 41 is curved, which, when utilized in accordance with the present invention, enables the blade 34 to more effectively saw through grasses and the like. In any case, as will be better understood further herein, the tang 37, the unsharpened portion 42 of the leading edge 40, and the trailing edge 43 of the cutting portion 39 all cooperate with the guide plate 12 to provide the previously described safety features.

As particularly shown in FIGS. 3 and 4, a pair of shims 44 may be provided in connection with each blade 34. In particular one shim 44 is placed about the mounting hole 36 of each blade 34 between the blade 34 and the top cover 20, and a second shim 44 is placed about the mounting hole 36 through the blade 34 between the blade 34 and the bottom cover 21. These shims 44, which suitably comprise C260 brass alloy or a like material, form or otherwise act as a bearing between the corresponding blade 34 and the top and bottom covers 20, 21, respectively. In this manner, the blade 34 is free to rotate about its corresponding axis 45 in operation of the present invention.

Figure 7:
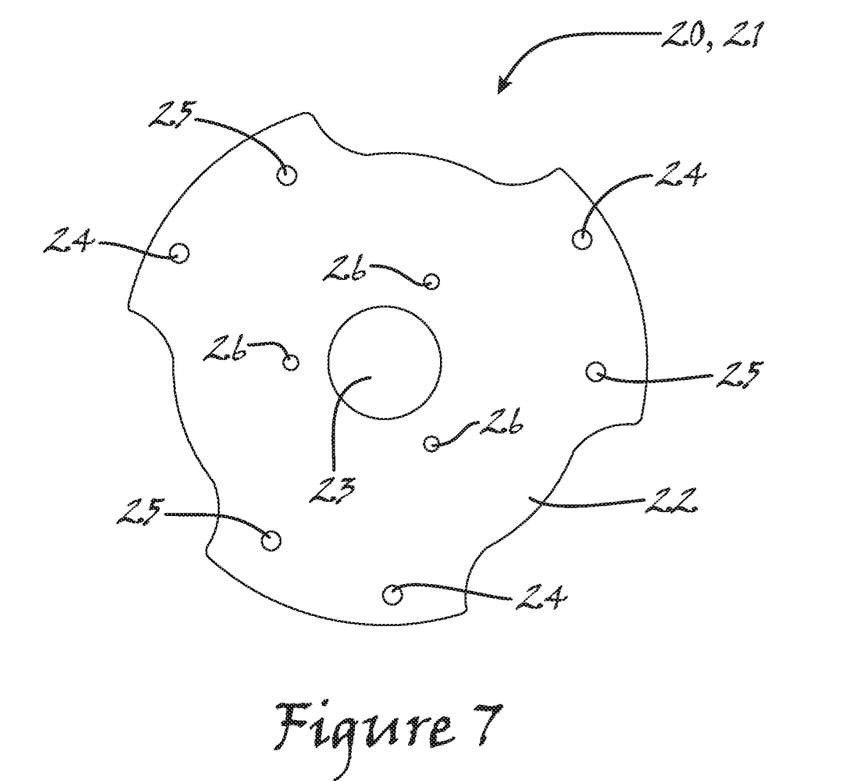
FIG. 7 shows, in a top plan view, various details of the identically formed top and bottom covers of the blade assembly of FIG. 1.
Figure 8:
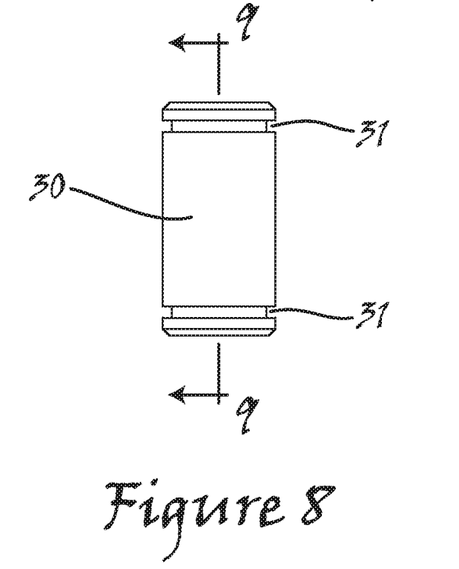
FIG. 8 shows, in a side elevational view, various details of a pin, as forms a part of each fastener, axle and selectively removable stop of the blade assembly of FIG. 1.
Figure 9:
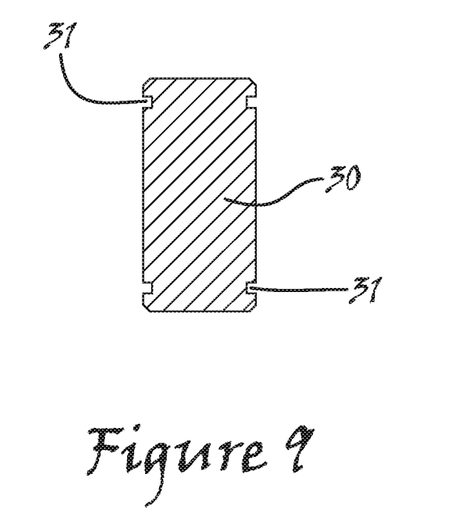
FIG. 9 shows, in a cross sectional view taken through cut line 9-9 of FIG. 8, various additional details of the pin of FIG. 8.
Figure 10:
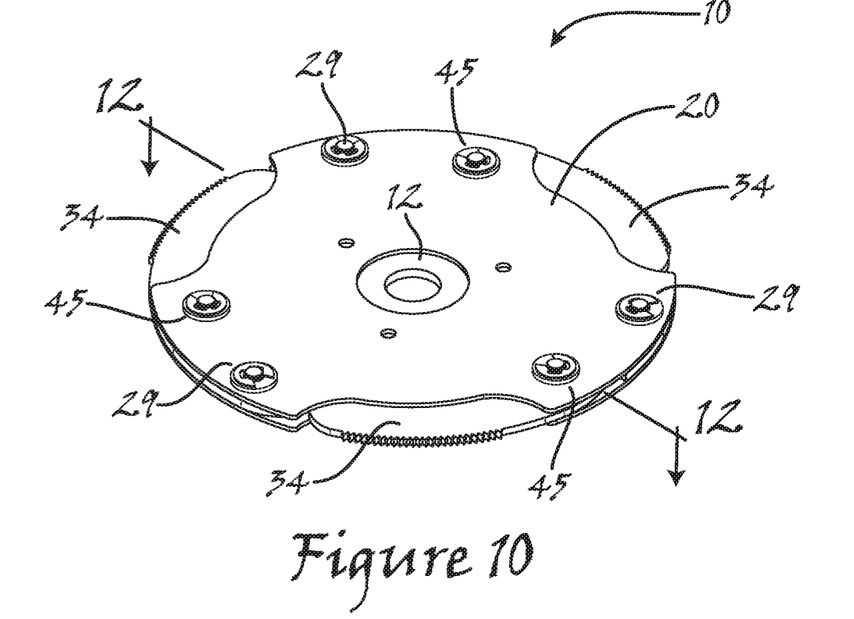
FIG. 10 shows, in an upper isometric view, various details of the assembled blade assembly of FIG. 1.
Figure 11:
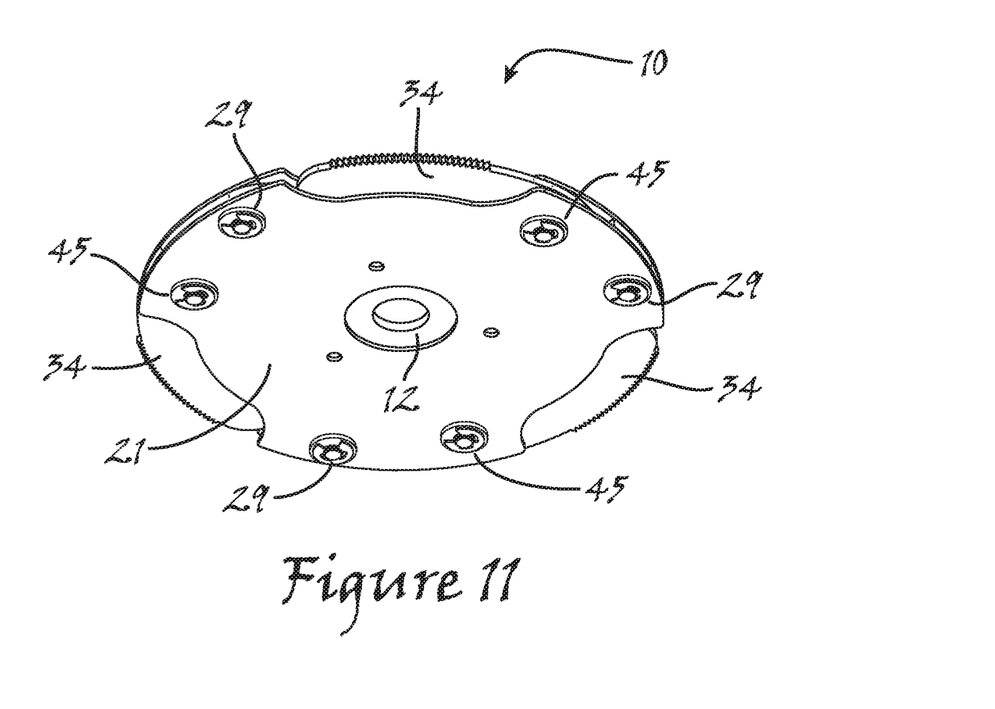
FIG. 11 shows, in a lower isometric view, various additional details of the assembled blade assembly of FIG. 1.

As particularly shown in FIG. 7, the substantially planar plate 22 forming each of the top cover 20 and bottom cover 21 is shown to include a central aperture 23 through which the guide plate 12 is mounted to a suitable rotary drive 46. Each cover plate 22 also comprises a plurality of guide plate mounting holes 24 corresponding to the guide plate mounting holes 14 of the guide plate 12. As will be understood by those of ordinary skill in the art, especially with reference to FIGS. 1 through 4, the fasteners 29 pass through the mounting holes 24 of the top cover 20 and bottom cover 21, as well as the intermediate mounting holes 14 of the guide plate 12. As shown in FIGS. 8 and 9, each fastener 29 comprises a simple steel or like material pin 30, which has a circumferential groove 31 provided adjacent each end thereof. Although those of ordinary skill in the art will recognize many alternatives, the described arrangement provides the desirable characteristic of a fixed length fastener 29 through the rotatable body 11. In any case, as shown in the figures, each fastener 29 also comprises washers 32 and external circlips 33 to secure the pins 30 in place, thereby fixing the guide plate 12 within the space between the top cover 20 and the bottom cover 21. Those of ordinary skill in the art, however, will readily recognize many alternative implementations of the fasteners 29, all of which should be considered within the scope of the present invention.

As also shown in FIG. 7, the planar plate 22 of the top cover 20 and bottom cover 21 comprises a plurality of stand-off mounting holes 26 corresponding to the stand-off mounting holes 15 through the guide plate 12. More importantly, however, the planar plate 22 of the top cover 20 and bottom cover 21 also comprises a plurality of hinge holes 25 for receiving the axle for each blade 34. As a consequence, it should be noted that the top cover 20 and bottom cover 21 serve to fix the position of each blade 34 with respect to the guide plate 12. Additionally, it is again noted that in implementations of the present invention including a capture mechanism, the relative positioning of the blades 34 with respect to the guide plate 12, as well as the shapes of each, are critical to the previously described cooperative adaptations. Although the shapes of each may vary by particular implementation, the arrangement of the implemented shapes should not inadvertently change in use. As a result, the substantially planar plate 22 forming each cover 20, 21 should comprise a structurally stable material such as, for example, A6061 aluminum alloy or the like.

Figures 12, 13:
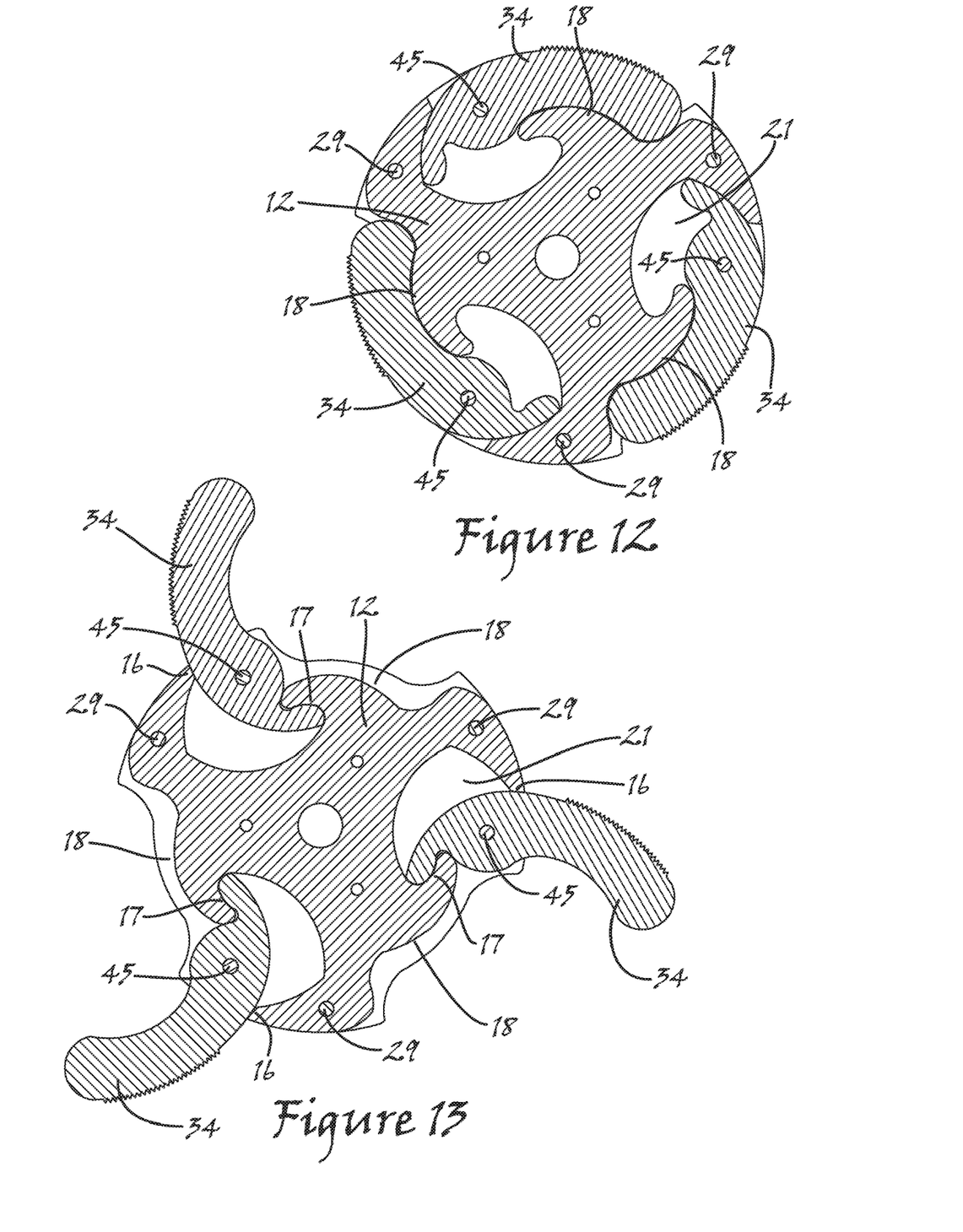
FIG. 12 shows, in a cross sectional view taken through cut line 12-12 of FIG. 10, still further details of the assembled blade assembly of FIG. 1.
FIG. 13 shows, in a cross sectional view corresponding to the view of FIG. 12, various details of the assembled blade assembly of FIG. 1; as the inertially deployed blades are extended in use.

Referring now to FIGS. 10 through 13, the assembled blade assembly 10 as heretofore described is depicted. Referring to FIG. 12, in particular, the blade assembly 10 is depicted with the blades 34 in their respective fully retracted positions. As shown in the figure, the trailing edge 43 of each exteriorly deployable cutting portion 39 rests conformingly against the corresponding backstop 18 provided in the guide plate 12. As will be appreciated by those of ordinary skill in the art, with the aid of this exemplary description and reference to FIG. 12 in particular, this cooperative adaptation between each blade 34 and the guide plate 12 serves to prevent damage to the blades 34 or the rotatable body 11 in the event that a blade impacts a rock or the like.

Similarly, as shown in FIG. 13, which depicts the blade assembly 10 with the blades 34 in their fully extended positions, the unsharpened portion 42 of the leading edge 40 of each blade 34 rests firmly against the first full extension stop 16 provided in the planar guide plate 12 while the tang 37 of each blade 34 fits conformingly against the second fill extension stop 17 provided in the guide plate 12. As will be appreciated by those of ordinary skill in the art, with the aid of this exemplary description and reference to FIG. 13 in particular, this cooperative adaptation between each blade 34 and the guide plate 12 serves to form a capture mechanism preventing discharge of a blade even if the corresponding hinge pin or otherwise formed axle 45 through the blade 34 should break or become unintentionally dislodged. In the unlikely event that a blade 34 is ejected, however, the angular momentum of the released blade 34 will be reversed as the tang 37 slides out of place against the second full extension stop 17. This in turn will at least cause the released blade 34 to travel a far less distance than would be the case in the absence of the capture mechanism.

Figure 14:
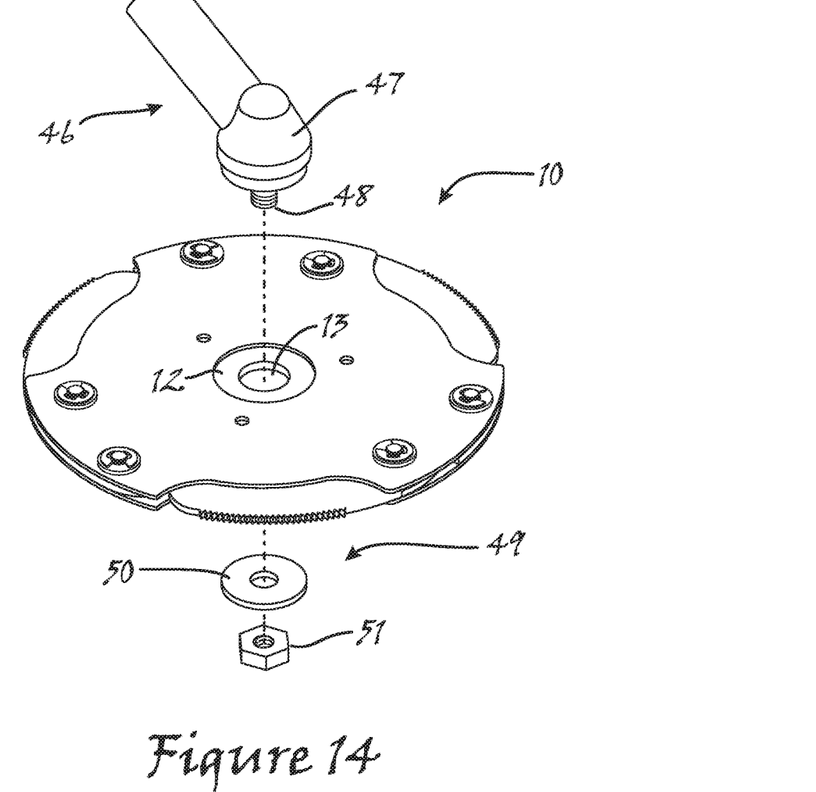
FIG. 14 shows, in a partially exploded upper isometric view; various details of the mating of the blade assembly of FIG. 1 with a rotary drive, in initial preparation for use.
Figure 15:
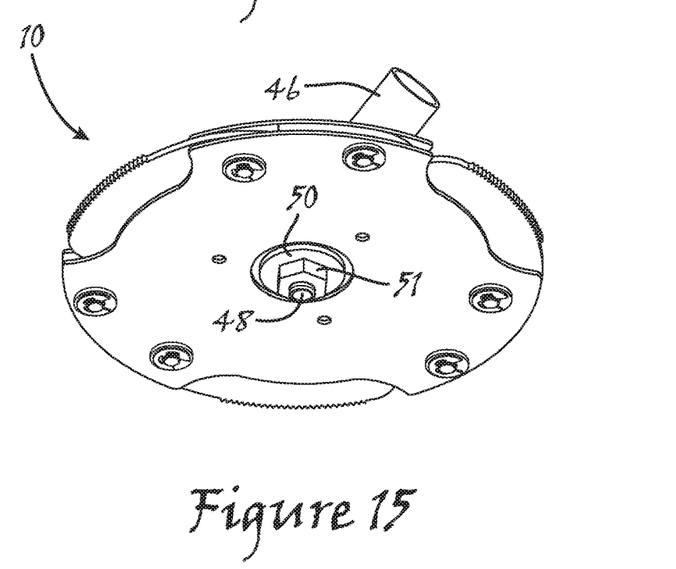
FIG. 15 shows, in a lower isometric view; various details of the blade assembly of FIG. 1 as mated with the rotary drive of FIG. 14.
Figure 16:
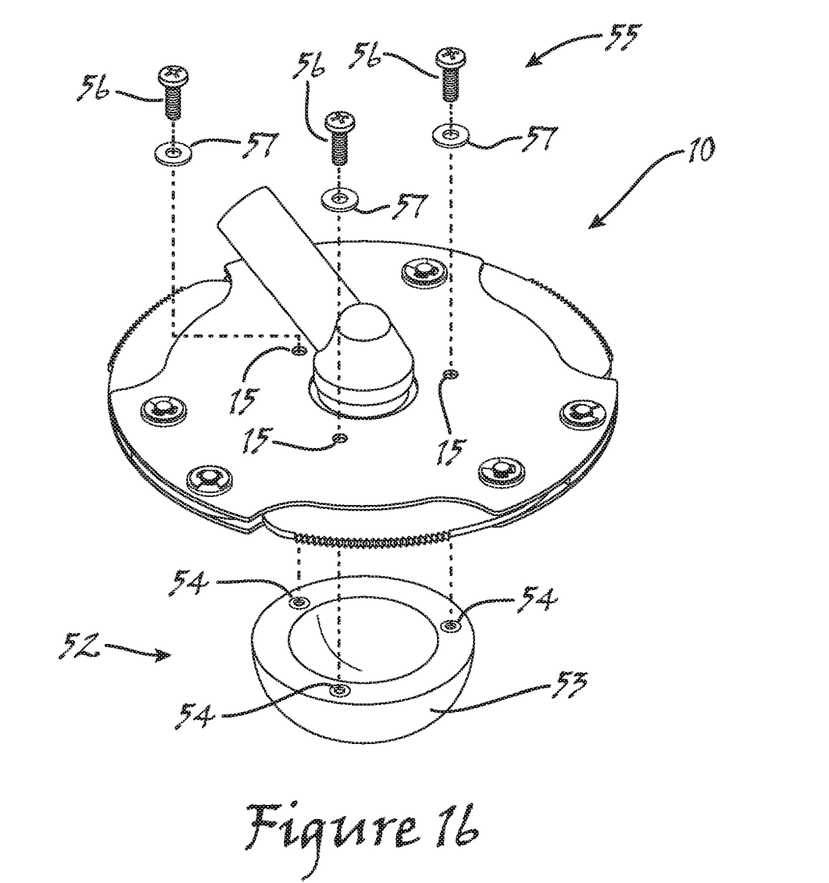
FIG. 16 shows, in a partially exploded upper isometric view; various details of the is mating of the attachment of a stand-off to the blade assembly of FIG. 1.
Figure 17:
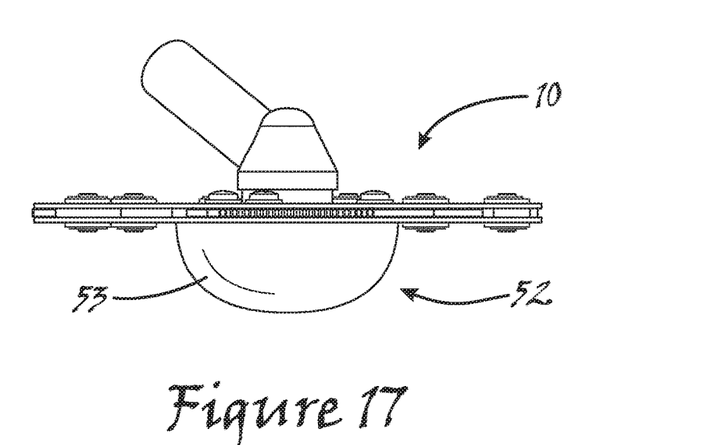
FIG. 17 shows, in a side elevational view; various details of the blade assembly of FIG. 1, with the stand-off of FIG. 16 attached for use.

Referring now to FIGS. 14 through 17, operation of the present invention is now described. In preparation for use of the blade assembly 10, the blade assembly 10 is first affixed to a rotary drive 46 such as, for example, a brush trimmer or the like. Although a typical brush trimmer is shown for purposes of this exemplary only description, those of ordinary skill in the art should appreciate that the present invention is readily usable with any of a very wide variety of otherwise conventional rotary drives 46. In any case, as shown in FIG. 14 in particular, such a rotary drive 46 will generally comprise a drive head 47, which may include a gearbox or other like mechanisms, and which will generally have a driveshaft 48 extending therefrom. As shown in the figure, the blade assembly 10 is positioned with respect to the rotary drive 46 such that the driveshaft 48 inserts through the assembly mounting hole 13 provided in the guide plate 12. With the blade assembly 10 so positioned, conventional coupling hardware 49 such, as for example, a thrust washer 50, a thrust nut 51, or the like, is utilized to secure the guide plate 12 to the drive head 47 of the rotary drive 46. Those of ordinary skill in the art, however, will recognize that differing or additional hardware may be required to ensure that the blade assembly 10 is centered with respect to the driveshaft 48, the selection and implementation of which is well within the ordinary skill in the art.

If desired, a stand-off assembly 52 may be provided in connection with the blade assembly 10, which stand-off assembly 52 is generally adapted to prevent the bottom surfaces of the blade assembly 10 from coming into contact with the ground, thereby preventing impact with rocks and the like. Although those of ordinary skill in the art will recognize many alternatives, such a stand-off assembly 52 may be formed as the depicted exemplary cup 53 of plastics or like material. Likewise, molded-in threaded inserts 54 may be readily provided in such an implementation. In such a case, as particularly shown in FIGS. 16 and 17, conventional mounting hardware 55 such as, for example, machine screws 56 and washers 57, may be utilized to readily attach the stand-off assembly 52 utilizing the previously described stand-off mounting holes 26 through each of the top cover 20 and bottom cover 21 and the stand-off mounting holes through the guide plate 12.

With the blade assembly 10 mounted to a suitable rotary drive 46, herein defined as any device capable of applying a rotational force to the rotatable body 11 in accordance with the general requirements of the present invention, and a standoff assembly 52 affixed, if desired, a user operates the rotary drive 46 as otherwise is conventional, with the exception that it is to be expected that a lesser than conventional rotation speed will be required. in particular it is noted that the heavy and thick structure of each blade 34, as well as the mass of the guide plate 12, produce a flywheel type effect, whereby the momentum of the rotating blade assembly 10 will serve to readily cut through virtually any grass, weed, or light brush as may typically be found in the intended environment. Additionally, Applicant has discovered through experimental use that the curved blade structure of the blade assembly 10 effectively cuts through grass and the like at the lower speeds without pulling or otherwise throwing materials, both of which are well known deficiencies typical with conventional blade systems. In operation, the blades 34 will have the full range of motion between that depicted in FIG. 12 and that depicted in FIG. 13, the exact position being a function of rotation speed applied to the blade assembly 10. In the event that an is object is encountered, the blade 34 encountering the object will immediately return from its extended position to the position as depicted in FIG. 12, whereby the force will be arrested by contact with the backstop 18, and after which the blade 34 will again inertially deploy and return to operation undamaged.

Figure 18:
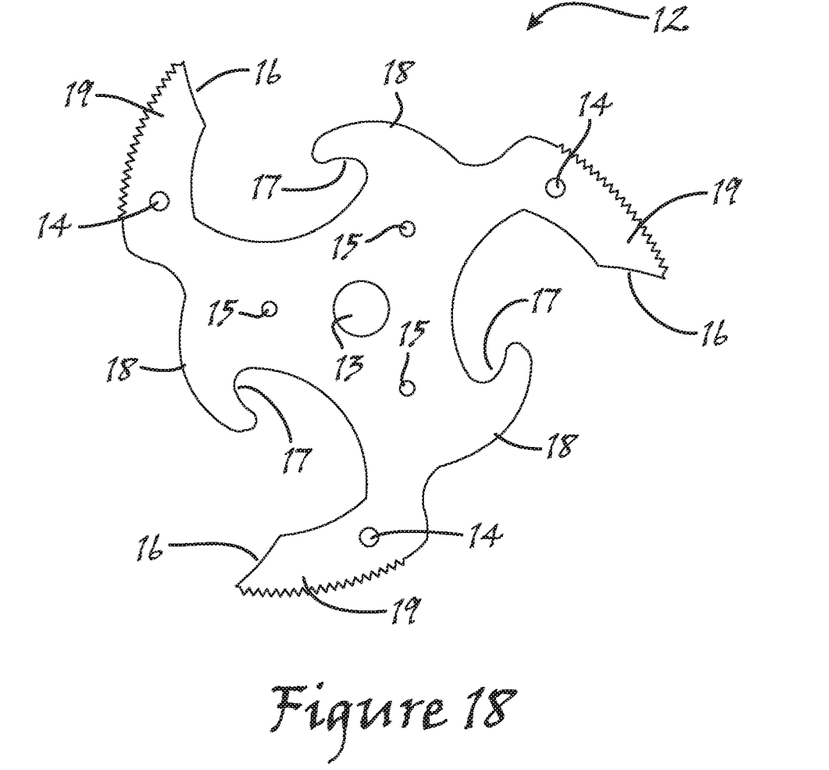
FIG. 18 shows, in a top plan view; various details of an alternative guide plate, as implemented in a first extension to the preferred implementation of the present invention.
Figure 19:
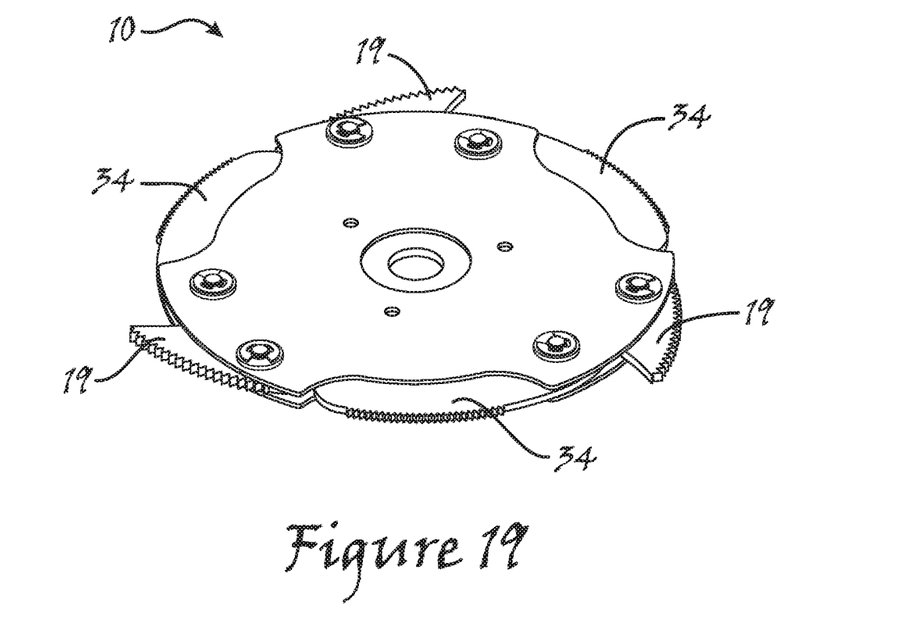
FIG. 19 shows, in an upper isometric view, various additional details of the of the extension of FIG. 18.
Figure 20:
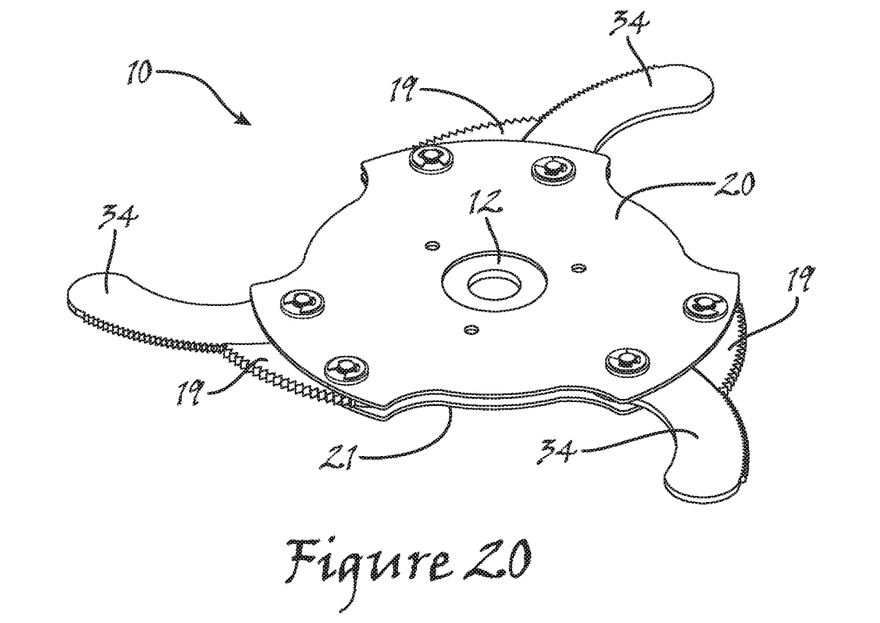
FIG. 20 shows, in an upper isometric view corresponding to the view of FIG. 19, various details of the of the extension of FIG. 18, as the inertially deployed blades are extended in use.

Although the described invention presents a dramatic improvement over the present state of the art, it is noted that extensions of the invention may be implemented. For example, the guide plate 12 may be provided with a plurality of fixed blades 19, as particularly shown in FIGS. 18 through 20. In such a case, the first full extension stop 16 is still provided but is elongated as shown in the figures. As shown in FIGS. 19 and 20, the blades 34 will, in such an embodiment, retain the same full range of motion as depicted with respect to the first described embodiment of the guide plate 12, and as particularly shown in FIGS. 12 and 13.

Figure 21:
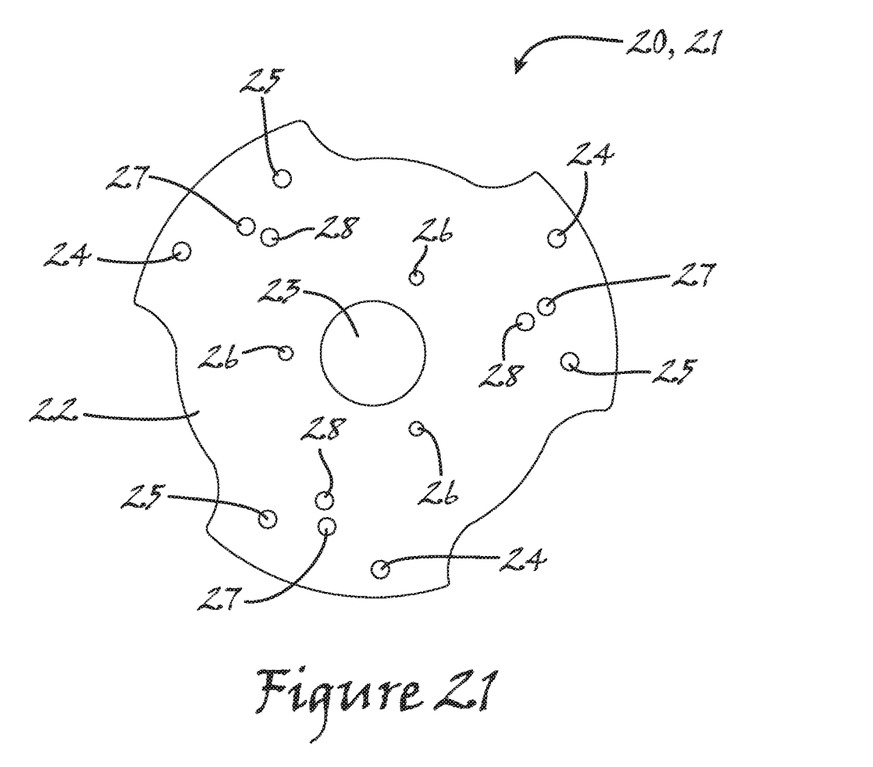
FIG. 21 shows, in a top plan view, various details of an alternative top and bottom cover, as implemented in a further extension to the preferred implementation of the present invention.
Figure 22:
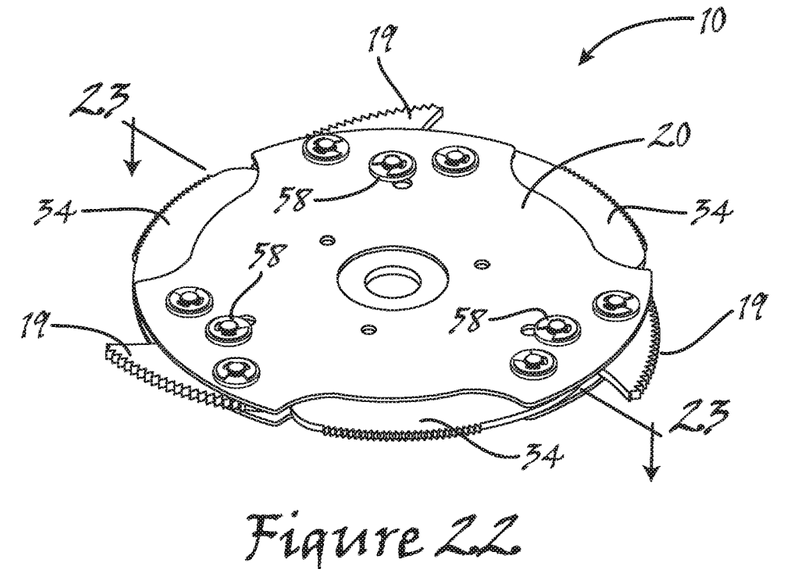
FIG. 22 shows, in an upper isometric view, various details of the blade assembly, as implemented with the alternative cover of FIG. 21 and utilizing selectively removable stops to lock the inertially deployed blades in their respective fully retracted positions.
Figure 23:
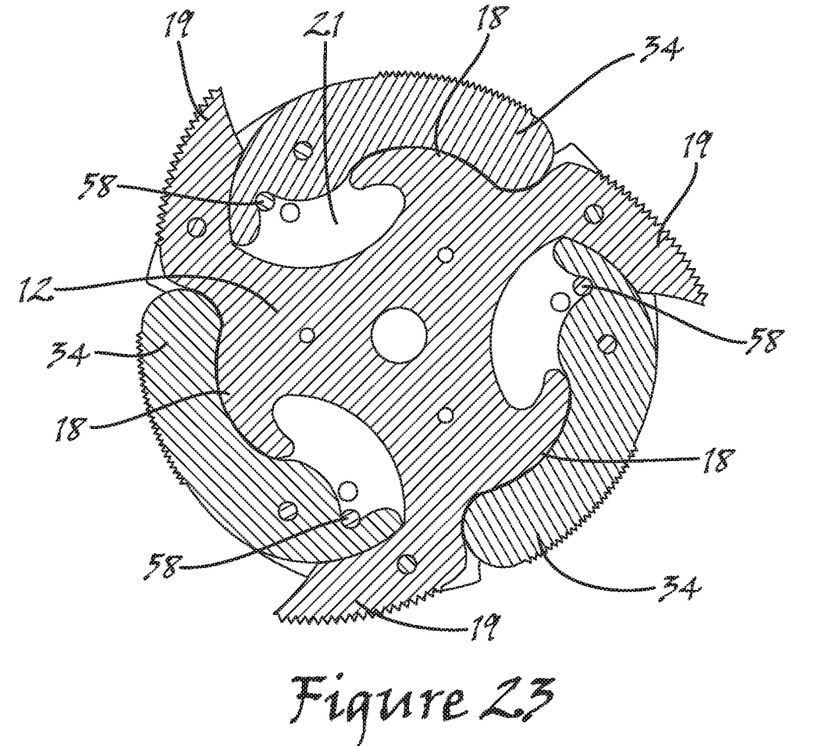
FIG. 23 shows, in a cross sectional view taken through cut line 23-23 of FIG. 22, various additional details of the blade assembly of FIG. 22.
Figure 24:
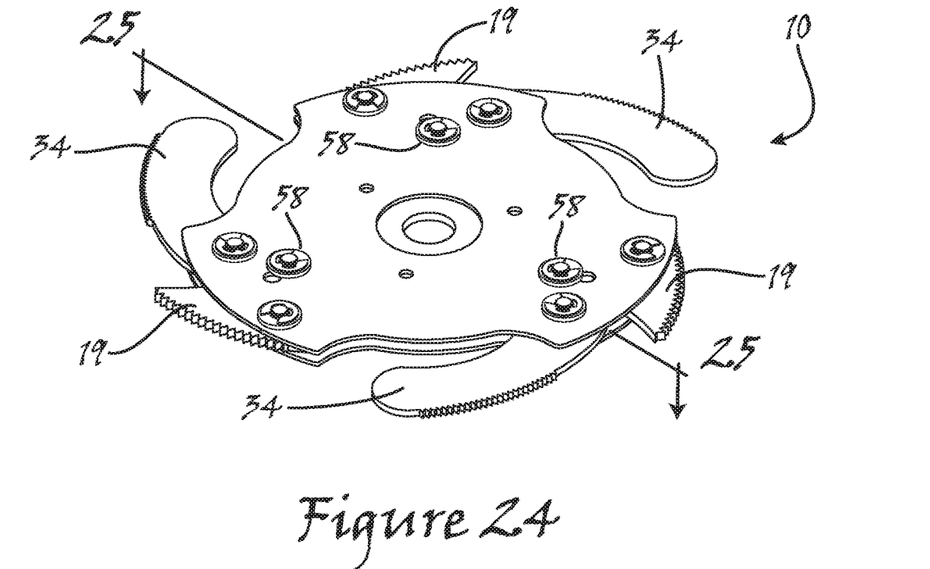
FIG. 24 shows, in an upper isometric view corresponding to the view of FIG. 22; various details of the blade assembly, as implemented with the alternative cover of FIG. 21 and utilizing selectively removable stops to restrict the inertially deployed blades to their respective partially extended positions.
Figure 25:
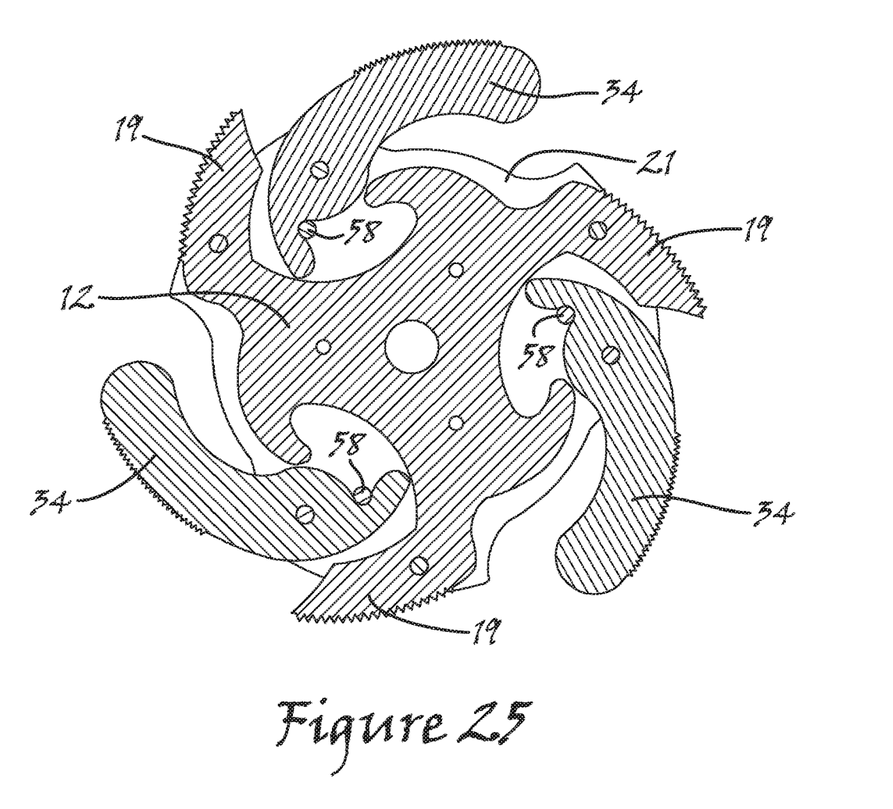
FIG. 25 shows; in a cross sectional view taken through cut line 25-25 of FIG. 24, various additional details of the blade assembly of FIG. 24.

Although, as previously noted, the inertially deployed blades 34 in the implementation additionally comprising fixed blades 19 will ordinarily have the same full range of motion as previously described, it may be particularly desirable in such an implementation to limit the range of motion of the otherwise free blades 34. To this end, as particularly shown in FIG. 21, a second implementation of the planar plate 22 forming the top cover 20 and bottom cover 21 may include the provision of a first set of locking pin holes 27, or the provision of both a first set of locking pin holes 27 and a second set of locking pin holes 28. As particularly shown in FIGS. 21 through 25, the first set of locking pin holes 27 are positioned to lock the blades 34 in their respective fully retracted positions. This may be desirable in a case where heavier than ordinary brush is to be attacked with the fixed blades 19 only, and it is therefore deemed desirable to retract the blades 34 in order prevent excessive wear or impact on the inertially deployable blades 34. On the other hand, as particularly shown in FIGS. 24 and 25 the second set of locking pin is holes 28 are provided such that the inertially deployed blades 34 are limited in deployment to a partially extended position, which position may be used to temporarily align the blades 34 with the fixed blades 19. In any case, selectively provided blade stops 58 are inserted into either the first set of locking pin holes 27 or the second set of locking pin holes 28, if desired. As shown in the figures, suitable blade stops 58 may, for example, be formed identical to the fasteners 29 and the axles 45.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, those of ordinary skill in the art will recognize, in light of this exemplary description, that the implementation of selectively provided blade stops 58 is as fully applicable to the first described embodiment of the guide plate 12 as it is to the latter described implementation. In any case, because the scope of the present invention is much broader than any particular embodiment, the foregoing detailed description should not be construed as a limitation of the scope of the present invention, which is limited only by the claims appended hereto.

What is claimed is:

1. A blade assembly for cutting vegetative material of disparate types, said blade assembly comprising:
   a rotatable body adapted to couple to a rotary drive;
   a plurality of inertially deployable blades, each said blade being hingedly affixed to said rotatable body;
   a first set of selectively removable blade stops;
   a second set of selectively removable blade stops; and
   wherein:
      each said blade is rotatable between a first retracted position wherein said blade is substantially within the outer circumference of rotation of said body, and a second extended position wherein a cutting portion of said blade extends outward from the outer circumference of rotation of said body;
      said cutting portion of each said blade comprises a curved cutting edge; and
      said first set of selectively provided blade stops is adapted to retain each said blade in the corresponding said first retracted position.

2. The blade assembly for cutting vegetative material of disparate types as recited in claim 1, wherein said second set of selectively provided blade stops is adapted to retain each said blade in a position intermediate the corresponding said first retracted position and the corresponding said second extended position.

3. A blade assembly for cutting vegetative material of disparate types said blade assembly comprising:
   a rotatable body adapted to couple to a rotary drive;
   a plurality of inertially deployable blades, each said blade being hingedly affixed to said rotatable body; and
   wherein:
      each said blade is rotatable between a first retracted position wherein said blade is substantially within the outer circumference of rotation of said body, and a second extended position wherein a cutting portion of said blade extends outward from the outer circumference of rotation of said body;

said body comprises a guide plate, and each said blade is cooperatively configured with said guide plate to form an associated capture mechanism, each said associated capture mechanism being adapted to prevent detachment of the associated said blade from said body in the event the hinged affixation of said blade fails;

said capture mechanism for each blade comprises a first point of contact between the corresponding said blade and said guide plate and a second point of contact between the corresponding said blade and said guide plate; and said blade assembly further comprises a first set of selectively provided blade stops.

4. The blade assembly for cutting vegetative material of disparate types as recited in claim 3, wherein said first set of selectively provided blade stops is adapted to retain each said blade in the corresponding said first retracted position.

5. The blade assembly for cutting vegetative material of disparate types as recited in claim 4, wherein said blade assembly further comprises a second set of selectively provided blade stops.

6. The blade assembly for cutting vegetative material of disparate types as recited in claim 5, wherein said second set of selectively provided blade stops is adapted to retain each said blade in a position intermediate the corresponding said first retracted position and the corresponding said second extended position.

7. The blade assembly for cutting vegetative material of disparate types as recited in claim 3, wherein said first set of selectively provided blade stops is adapted to retain each said blade in a position intermediate the corresponding said first retracted position and the corresponding said second extended position.

8. The blade assembly for cutting vegetative material of disparate types as recited in claim 3, wherein each said cutting edge is serrated.

9. The blade assembly for cutting vegetative material of disparate types as recited in claim 3, wherein each said cutting edge is sharpened.

10. The blade assembly for cutting vegetative material of disparate types as recited in claim 3, wherein said rotatable body is adapted to couple to a brush trimmer.

11. The blade assembly for cutting vegetative material of disparate types as recited in claim 3, wherein said guide plate is positioned between a top cover of said blade assembly and a bottom cover of said blade assembly.

12. The blade assembly for cutting vegetative material of disparate types as recited in claim 11, wherein said guide plate comprises a plurality of fixed blades.

13. The blade assembly for cutting vegetative material of disparate types as recited in claim 3, wherein said guide plate comprises a plurality of fixed blades.

* * * * *